Aug. 31, 1926.
A. B. MAST
1,597,920
INCUBATOR
Filed Dec. 5, 1925    2 Sheets-Sheet 1
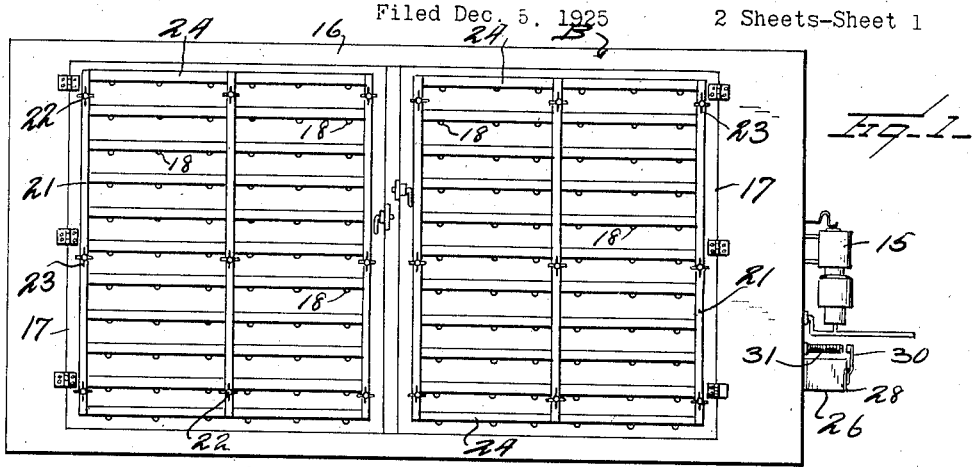
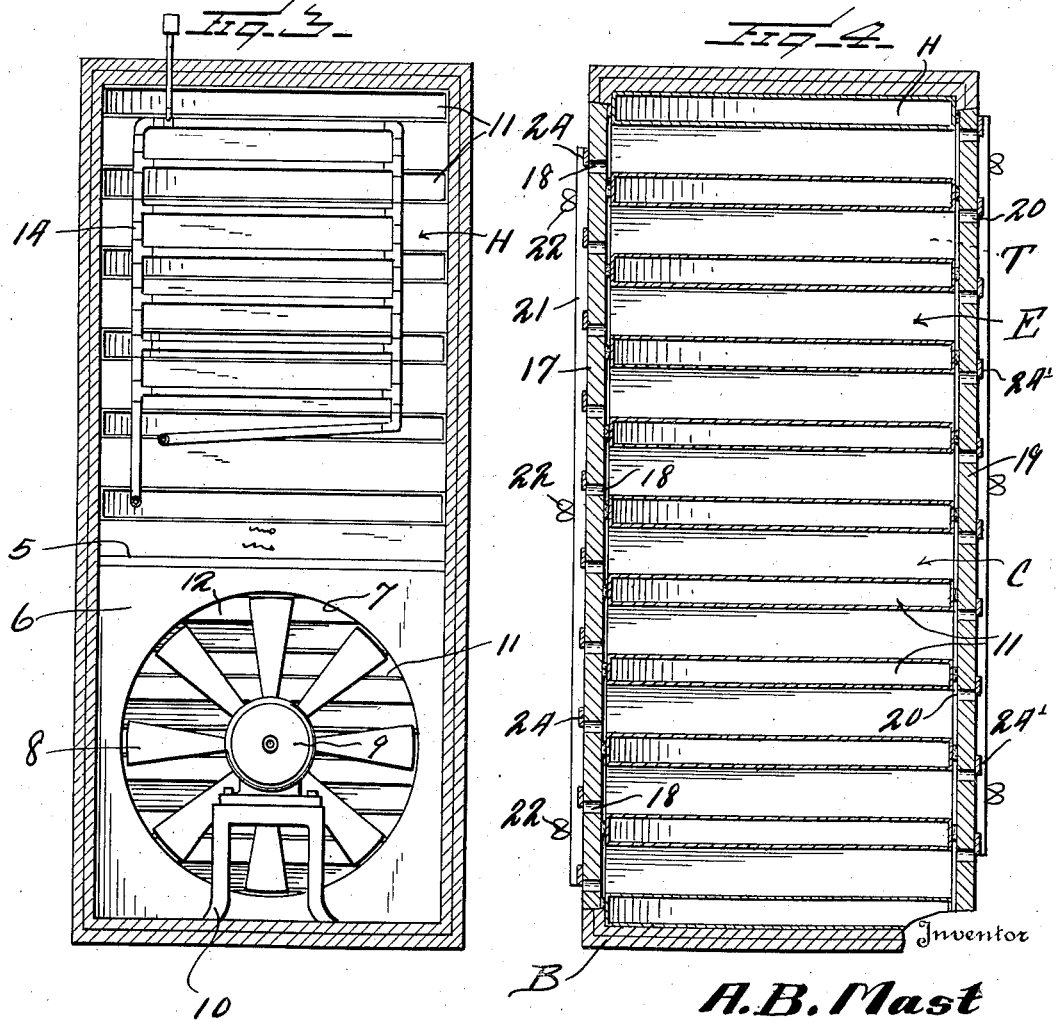
Inventor
A. B. Mast
By Watson E. Coleman
Attorney Aug. 31, 1926.

A. B. MAST

INCUBATOR

Filed Dec. 5, 1925 2 Sheets-Sheet 2

1,597,920

Inventor

A. B. Mast

By Watson E. Coleman

Attorney

Patented Aug. 31, 1926.

1,597,920

UNITED STATES PATENT OFFICE.

ALBERT B. MAST, OF SHANESVILLE, OHIO.

INCUBATOR.

Application filed December 5, 1925. Serial No. 73,439.

This invention relates to certain improvements in incubators and it is an object of the invention to provide a device of this kind provided with means whereby the temperature within the incubator is maintained at substantially a fixed degree through the medium of an air circulation and in a manner whereby such air is free of contact with the eggs so as not to carry off moisture from the eggs.

An additional object of the invention is to provide a device of this kind divided into an egg chamber, heating chamber and an air chamber with the egg chamber divided into egg compartments together with means for causing a circulation from the heating chamber to the air chamber and above and below the egg compartments.

The invention consists in the details of construction and in the combination and arrangement of the several parts of my improved incubator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating an incubator constructed in accordance with an embodiment of my invention;

Figure 3 is a sectional view taken substantially on the line 3—3 of Figure 2;

Figure 4 is a sectional view taken substantially on the line 4—4 of Figure 2.

Figure 2:
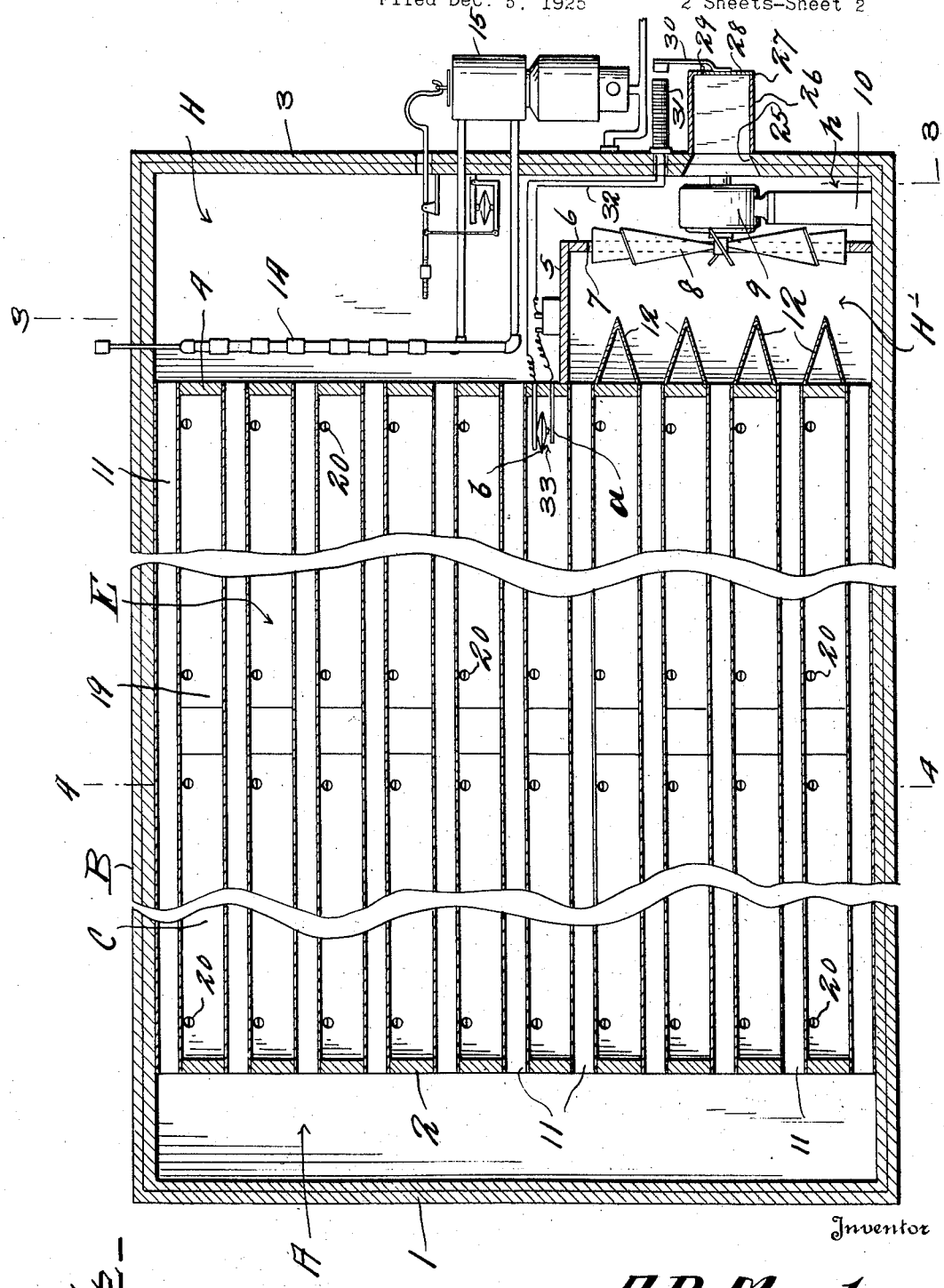
Figure 2 is an enlarged view partly in vertical section of the structure as herein disclosed.

As disclosed in the accompanying drawings, B denotes the body of my improved incubator provided adjacent one end wall 1 with a vertically disposed partition 2 providing an air chamber A and adjacent to its opposite end wall 3 with a vertically disposed partition 4 providing a heating chamber H. At a point preferably slightly below the vertical center of the chamber H is disposed a horizontally disposed wall 5 interposed between the partition 4 and the upper portion of the vertically disposed wall 6 extending across the chamber H and spaced from the adjacent end wall 3. The central portion of this wall 5 is provided with a relatively large opening 7 in which is positioned a blast fan 8 preferably driven by the motor 9 of an electric type. The motor 9 and the fan 8 carried thereby are supported in desired position by the stand 10 mounted upon the bottom of the chamber H proper.

Interposed between and supported by the partitions 2 and 4 are the vertically spaced air flues 11, said flues extending entirely across the body B with one of said flues at the bottom of the chamber E intermediate the partitions, and the uppermost of said flues being at the top of such chamber. This chamber E constitutes what may be termed the egg chamber and the flues 11 divide this chamber E into a plurality of vertically spaced egg compartments C in each of which is adapted to be placed the egg trays T of any ordinary or preferred type.

All of the flues 11 are in communication with the chamber A while the upper flues are in communication with the upper or larger portion of the chamber H while the lower or remainder of such flues are in communication with the sub-chamber H' within the lower portion of the chamber H and as created by both walls 5 and 6. The opening 7 hereinbefore referred to affords direct communication between the sub-chamber H' and the lower restricted portion $h$ of the chamber H proper.

The partition 4 between the flues 11 communicating with the sub-chamber H' is provided with the outstanding dividing members 12 disposed entirely across the body B, said members 12 being substantially V-shaped in cross section with their apices outwardly disposed. These members 12 operate to divide the air blast created by the fan 8 to cause air to pass through the lower flues 11 substantially in equal proportions.

Arranged within the upper or larger portion of the chamber H is a heating unit 14 preferably comprising a hot water coil leading from a conventional boiler 15 arranged exteriorly of the body B.

The front wall 16 of the body B is provided with the swinging doors 17 affording communication to the chamber E and each of said doors is provided with the horizontally disposed series of openings 18 each of said series having communication with the lower portion of an egg compartment C.

The back wall 19 is provided with the horizontally disposed series of openings 20 each of said series being in communication with the upper portion of a compartment C.

Each of the doors 17 adjacent its vertical marginal portions and at its central part is provided with the vertically disposed slide members 21 normally held against such sliding movement by the winged screws 22 operatively engaged with the door 17 and disposed through the longitudinally directed slots 23 in such slide members. These members 21 are connected by the valve strips 24 each coacting with a series of openings 18, but moving in unison. By proper manipulation of these valve strips 24, the passage of air through the openings 18 into the compartments C may be readily regulated as desired.

Coacting with the openings 20 in the back wall 19 are similar valve strips 24' supported and operating in the same manner as just explained in connection with the valve strips 24.

The end wall 3 of the body B is provided with an opening 25 affording communication with the lower reduced portion $h$ of the chamber H and an outstanding housing or box 26 carried by said end wall. The outer end of this housing or box 26 is provided with an intake opening 27 which is normally closed by the vertically swinging door 28, said door, as herein disclosed, having its upper portion hingedly connected, as at 29, to the housing or box. Extending upwardly from the hinged portion of this door 28, or valve as it may be termed, is an arm 30 which, when the door or valve 28 is in its closed position, terminates in such close proximity to the electro-magnet 31 as to be attracted thereby when the magnet is energized to move the door or valve 28 into open position. This magnet 31 is of a conventional type and is interposed in the circuit 32 and leads to a normally open circuit closer 33 positioned within a substantially central egg compartment C. This circuit closer 33, as herein disclosed, comprises a stationary contact $a$ and a thermostatic contact $b$ preferably of a wafer type. This contact $b$ upon expansion of the wafer has requisite engagement with the contact $a$ and upon requisite reduction of the degree of temperature, contracts to break the circuit.

The flues 11 have their walls preferably made from galvanized sheet metal although I do not wish to be understood as limiting myself in this respect.

In practice, the eggs to be hatched are placed within the trays T which are properly positioned within the egg compartments C and as the air in circulation passes through the flues 11 it will be readily understood that no heated air at any time comes directly in contact with the eggs and thus avoids the disadvantage of carrying moisture off from the eggs which otherwise has a tendency to result in had hatches.

The thermostatic contact member $b$ is preferably adjusted to maintain the temperature within the various egg compartments C between 99° and 100° and when the temperature rises above such degree, the resultant expansion of the contact $b$ will close the circuit 32 causing the door or valve 28 to open permitting the fan to draw in the cooler air from the atmosphere and thereby quickly reducing the temperature within the chamber E. When this temperature is reduced to the desired degree, the resultant contraction of the contact $b$ will open the circuit and the door or valve 28 will immediately drop into closed position. The air in circulation through the various compartments C is heated by the unit 14 and it is to be particularly noted that normally the air circulation is entirely within the body B and is entirely independent of the outside temperature.

The various egg compartments are ventilated by the air passing through the openings 18 and 20 and which flow may be readily regulated or controlled as hereinbefore described.

The back wall 19 is preferably detachable so that it may be readily removed when desired to cool the eggs after removing them from the various compartments C. This cooling should be done once every twenty-four hours and is an important operation as it serves to exercise the chicks in the shells and to strengthen them to facilitate their hatching. When the back wall 19 is removed, the interior of the body B can be easily cleaned thus making the same germproof.

From the foregoing description it is thought to be obvious that an incubator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An incubator comprising, in combination, a body divided into an air chamber, heating chamber and an intermediate egg chamber, flues interposed between and in communication with the air chamber and the heating chamber, said flues dividing the egg chamber into egg compartments, means for dividing the heating chamber into an upper chamber and a sub-chamber, the lower flues being directly in communication with said sub-chamber, said sub-chamber being in communication with the lower part of the upper chamber, and a blast fan discharging within the sub-chamber to create the requisite air circulation.

2. An incubator comprising, in combination, a body divided into an air chamber, heating chamber and an intermediate egg chamber, flues interposed between and in communication with the air chamber and the heating chamber, said flues dividing the egg chamber into egg compartments, means for dividing the heating chamber into an upper chamber and a sub-chamber, the lower flues being directly in communication with said sub-chamber, said sub-chamber being in communication with the lower part of the upper chamber, a blast fan discharging within the sub-chamber to create the requisite air circulation, and a heating medium arranged within the upper chamber.

3. An incubator comprising, in combination, a body divided into an air chamber, heating chamber and an intermediate egg chamber, flues interposed between and in communication with the air chamber and the heating chamber, said flues dividing the egg chamber into egg compartments, means for dividing the heating chamber into an upper chamber and a sub-chamber, the lower flues being directly in communication with said sub-chamber, said sub-chamber being in communication with the lower part of the upper chamber, a blast fan discharging within the sub-chamber to create the requisite air circulation, and dividing members extending across the sub-chamber and positioned between each pair of adjacent flues, said members being substantially V-shaped in cross section with their apices outwardly disposed.

In testimony whereof I hereunto affix my signature.

ALBERT B. MAST.